US012683216B2

(12) United States Patent
Zhou et al.

(10) Patent No.: US 12,683,216 B2
(45) Date of Patent: Jul. 14, 2026

(54) END CAP ASSEMBLY, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Xiangyan Bu, Ningde (CN); Quankun Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 662 days.

(21) Appl. No.: 18/111,903

(22) Filed: Feb. 21, 2023

(65) Prior Publication Data

US 2023/0395894 A1 Dec. 7, 2023

Related U.S. Application Data

(63) Continuation of application No. PCT/CN2021/143499, filed on Dec. 31, 2021.

(30) Foreign Application Priority Data

Jul. 20, 2021 (CN) .......................... 202121655242.6

(51) Int. Cl.
*H01M 10/6551* (2014.01)
*H01M 10/48* (2006.01)
(Continued)

(52) U.S. Cl.
CPC ..... *H01M 10/6551* (2015.04); *H01M 10/486* (2013.01); *H01M 10/647* (2015.04);
(Continued)

(58) Field of Classification Search
CPC ............. H01M 50/147; H01M 50/394; H01M 50/383; H01M 50/593; H01M 50/143;
(Continued)

(56) References Cited

U.S. PATENT DOCUMENTS

2006/0216592 A1* 9/2006 Chun ................... H01M 50/103
429/175
2012/0196160 A1* 8/2012 Guen ................... H01M 50/553
429/163
(Continued)

FOREIGN PATENT DOCUMENTS

CN 103515645 A 1/2014
CN 106450049 A 2/2017
(Continued)

OTHER PUBLICATIONS

Wang (CN 207303258 U) machine translation of description with line Nos. added (Year: 2018).*
(Continued)

*Primary Examiner* — Jessie Walls-Murray
(74) *Attorney, Agent, or Firm* — XSENSUS LLP

(57) ABSTRACT

Embodiments of this application provide an end cap assembly, a battery cell, a battery, and an electrical device. The end cap assembly may be applicable to the battery cell. The end cap assembly may include: an end cap; and an end cap patch attached to the end cap. At least one through-hole may be made on the end cap patch. The through-hole may be configured to be filled with a heat transfer structure. The end cap may exchange heat with the outside through the heat transfer structure so as to regulate a temperature inside the battery cell.

23 Claims, 6 Drawing Sheets

(51) Int. Cl.
| | |
|---|---|
| *H01M 10/647* | (2014.01) |
| *H01M 50/15* | (2021.01) |
| *H01M 50/184* | (2021.01) |
| *H01M 50/186* | (2021.01) |

(52) U.S. Cl.
CPC ......... *H01M 50/15* (2021.01); *H01M 50/184* (2021.01); *H01M 50/186* (2021.01)

(58) Field of Classification Search
CPC .. H01M 50/15; H01M 10/653; H01M 50/184; H01M 10/486; H01M 50/55
See application file for complete search history.

(56) References Cited

U.S. PATENT DOCUMENTS

| | | | |
|---|---|---|---|
| 2016/0099444 A1 * | 4/2016 | Park | H01M 50/566 |
| | | | 429/82 |
| 2017/0214018 A1 * | 7/2017 | Sun | A62D 1/06 |
| 2019/0074486 A1 * | 3/2019 | Li | H01M 50/55 |
| 2020/0091484 A1 | 3/2020 | Guen | |
| 2021/0028425 A1 * | 1/2021 | Xiao | H01M 10/653 |
| 2022/0320676 A1 * | 10/2022 | Wakimoto | H01M 50/176 |

FOREIGN PATENT DOCUMENTS

| | | | | | |
|---|---|---|---|---|---|
| CN | 107949156 | A | | 4/2018 | |
| CN | 207250579 | U | | 4/2018 | |
| CN | 207303258 | U | * | 5/2018 | |
| CN | 108987844 | A | | 12/2018 | |
| CN | 109216594 | A | | 1/2019 | |
| CN | 209843907 | U | | 12/2019 | |
| CN | 209993628 | U | | 1/2020 | |
| CN | 110880623 | A | * | 3/2020 | .......... H01M 50/581 |
| CN | 111403845 | A | | 7/2020 | |
| CN | 111712968 | A | | 9/2020 | |
| CN | 212851202 | U | | 3/2021 | |
| IN | 210467900 | U | | 5/2020 | |
| IN | 111403853 | A | | 7/2020 | |
| JP | 2014003019 | A | | 1/2014 | |
| JP | 2021500708 | A | | 1/2021 | |
| JP | 2021064506 | A | | 4/2021 | |
| KR | 2013-0096895 | A | | 9/2013 | |
| KR | 10-2017-0069641 | A | | 6/2017 | |

OTHER PUBLICATIONS

Li, CN110880623A, machine translation of description with line numbers (Year: 2020).*

Office Action issued Apr. 21, 2025 in Korean Patent Application No. 10-2022-7037775 with English translation.

International Search Report and Written Opinion mailed on Apr. 20, 2022, received for PCT Application PCT/CN2021/143499, filed on Dec. 31, 2021, 11 pages including English Translation.

Extended European Search Report issued Oct. 5, 2023, in corresponding European Patent Application No. 21936243.1, 9 pages.

Office Action issued Jan. 15, 2024 in Japanese Patent Application No. 2022-567036 and machine English translation thereof.

* cited by examiner

END CAP ASSEMBLY, BATTERY CELL, BATTERY, AND ELECTRICAL DEVICE

CROSS-REFERENCE TO RELATED APPLICATIONS

This application is a continuation of International Application No. PCT/CN2021/143499, filed Dec. 31, 2021, which claims priority to Chinese Patent Application No. 202121655242.6, filed on Jul. 20, 2021 and entitled "END CAP ASSEMBLY, BATTERY CELL, BATTERY, AND ELECTRICAL DEVICE", each of which is incorporated herein by reference in its entirety.

TECHNICAL FIELD

This application relates to the technical field of batteries, and in particular, to an end cap assembly, a battery cell, a battery, and an electrical device.

BACKGROUND

Batteries are widely used in electronic devices such as a mobile phone, a notebook computer, an electric power cart, an electric vehicle, an electric airplane, an electric ship, an electric toy car, an electric toy ship, an electric toy airplane, and an electric tool.

A battery generates a lot of heat while being charged, discharged, or in use. If not dissipated in time, the heat not only shortens the service life of the battery, but also incurs safety hazards. Therefore, how to solve the heat dissipation of the battery is of vital importance and value to improvement of the service life and safety of the battery.

SUMMARY

Embodiments of this application provide an end cap assembly, a battery cell, a battery, and an electrical device to improve the service life and safety of the battery.

According to a first aspect, an embodiment of this application provides an end cap assembly applicable to a battery cell. The end cap assembly includes: an end cap; and an end cap patch attached to the end cap. At least one through-hole is made on the end cap patch. The through-hole is configured to be filled with a heat transfer member or structure. The end cap exchanges heat with the outside through the heat transfer member, so as to regulate a temperature inside the battery cell.

In the technical solution of this embodiment of this application, the through-hole is disposed on the end cap patch, and the through-hole is filled with the heat transfer member. Heat is transferred by using the heat transfer member. The battery cell can exchange heat with the outside through the end cap and the heat transfer member to regulate the temperature inside the battery cell, thereby improving the service life and safety of the battery.

In some embodiments, the heat transfer member is a heat transfer gel.

In the foregoing technical solution, the heat transfer gel possesses good properties of heat transfer and electrical insulation, and it is convenient to fill the through-hole with the heat transfer gel.

In some embodiments, the end cap includes a first body and a first protruding portion. The first protruding portion protrudes away from the interior of the battery cell. A first recessed portion recessed away from the interior of the battery cell is formed at a position that corresponds to the first protruding portion and that is located on the first body. The first recessed portion is configured to accommodate at least a part of an electrode assembly of the battery cell.

In the foregoing technical solution, the first recessed portion recessed away from the interior of the battery cell is formed at the position that corresponds to the first protruding portion and that is located on the first body of the end cap. The first recessed portion can accommodate at least a part of an electrode assembly, and vacate more space for the electrode assembly, thereby helping to increase an energy density of the battery cell. The disposed first protruding portion can make the first recessed portion recessed away from the interior of the battery cell as far as practicable, thereby helping at least a part of the electrode assembly be accommodated in the first recessed portion.

In some embodiments, the through-hole is made in a part of the end cap patch at which the end cap patch is attached to the first body.

In the foregoing technical solution, the through-hole is made in the part of the end cap patch at which the end cap patch is attached to the first body, and the part of the first body is closer to the interior of the battery cell than the first protruding portion, thereby helping to regulate the temperature inside the battery cell.

In some embodiments, the end cap patch includes a first part and a second part that are attached to the first body. Along a length direction of the end cap patch, the first part is located on both sides of the first protruding portion. Along a width direction of the end cap patch, the second part is located on both sides of the first protruding portion. The second part is located between the two first parts, and the through-hole is made in the first parts.

In the foregoing technical solution, the through-hole is made in the first part, and the second part is located on both sides of the first protruding portion along the width direction of the end cap patch. The width of the second part is usually small. The first part is disposed on both sides along the length direction of the end cap patch. The width of the first part is much greater than the width of the second part, thereby facilitating opening of the through-hole.

In some embodiments, an aperture of the through-hole is less than 10 mm.

In the foregoing technical solution, if the aperture of the through-hole is excessive, the insulation performance of the end cap patch will be impaired. The aperture of the through-hole being less than 10 mm ensures sufficient insulation performance of the end cap patch.

In some embodiments, a total area of the at least one through-hole is 10% to 50% of an area of the first part.

In the foregoing technical solution, the larger the total area of the through-holes, the worse the insulation performance. The smaller the total area of the through-holes, the worse the heat transfer performance. The total area of the through-holes being set to 10% to 50% of the area of the first part not only ensures relatively high insulation performance of the end cap patch, but also ensures a sufficient area of the heat transfer member in the through-hole, without impairing the heat transfer performance.

In some embodiments, a temperature sensor is disposed in the through-hole and configured to acquire a temperature inside the battery cell.

In the foregoing technical solution, the temperature sensor is disposed in the through-hole. The temperature sensor can be fixed through the heat transfer member, thereby facilitating fixation of the temperature sensor. In this way, the temperature inside the battery cell can be acquired conveniently through the heat transfer of the heat transfer member, thereby facilitating temperature acquisition.

According to a second aspect, an embodiment of this application provides a battery cell. The battery cell includes a housing, an electrode assembly, and the end cap assembly according to any embodiment in the first aspect of this application. An opening is made at an end of the housing. An electrode assembly is accommodated in the housing. An end cap fits and covers the opening.

According to a third aspect, an embodiment of this application provides a battery. The battery includes the battery cell according to any embodiment in the second aspect of this application, and a thermal management component. The end cap exchanges heat with the thermal management component through the heat transfer member, so as to regulate the temperature inside the battery cell.

In the foregoing technical solution, the end cap can exchange heat with the thermal management component through the heat transfer member, thereby improving efficiency of heat transfer between the battery cell and the thermal management component, and making it convenient to regulate the temperature of the battery cell through the thermal management component.

In some embodiments, the thermal management component is attached to a first part of the end cap patch, and the thermal management component is configured to regulate the temperature inside the battery cell.

In the foregoing technical solution, the thermal management component is attached to the first part to implement heat transfer between the battery cell and the thermal management component, thereby making it convenient to regulate the temperature of the battery cell through the thermal management component.

In some embodiments, the heat transfer member includes a first connecting portion, and the first connecting portion is disposed between the end cap and the end cap patch.

In the foregoing technical solution, the gap between the end cap and the end cap patch may be filled with the first connecting portion of the heat transfer member. In addition, the first connecting portion disposed between the end cap and the end cap patch further improves the effect of heat transfer between the end cap and the thermal management component.

In some embodiments, the heat transfer member includes a second connecting portion, and the second connecting portion is disposed between the end cap patch and the thermal management component.

In the foregoing technical solution, the gap between the heat transfer member and the thermal management component may be filled with the second connecting portion of the heat transfer member, thereby improving stability and firmness of the connection between the thermal management component and the end cap patch. In addition, the second connecting portion disposed between the end cap patch and the thermal management component further improves the effect of heat transfer between the end cap and the thermal management component.

In some embodiments, an electrode terminal is disposed on the end cap. The electrode terminal includes an end face oriented away from an interior of the battery cell. The thermal management component includes an outer surface oriented away from the interior of the battery cell. Along a thickness direction of the end cap patch, the outer surface is closer to the interior of the battery cell than the end face.

In the foregoing technical solution, the outer surface of the thermal management component is closer to the interior of the battery cell than the end face of the electrode terminal.

Therefore, the thermal management component disposed on the battery cell is prevented from increasing the overall height of the battery.

According to a fourth aspect, an embodiment of this application provides an electrical device. The device includes the battery according to any embodiment in the third aspect of this application. The battery is configured to provide electrical energy.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
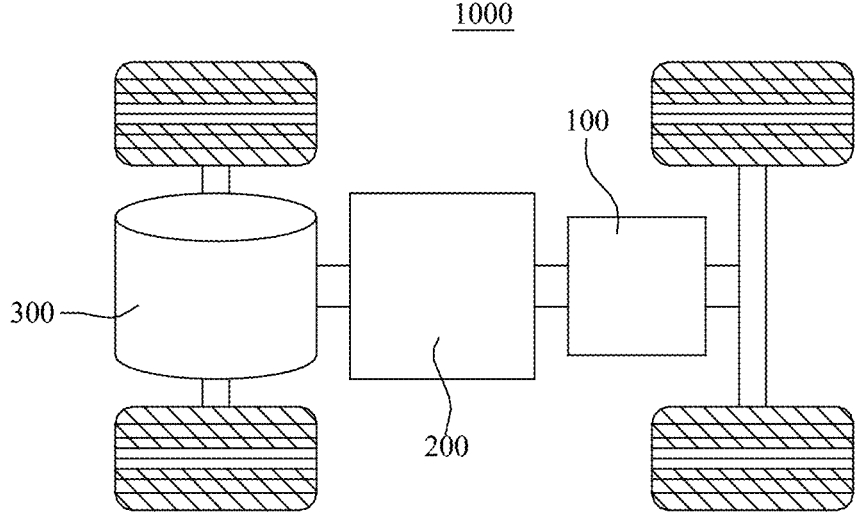
FIG. 1 is a schematic structural diagram of a vehicle according to some embodiments of this application.

The drawings are not necessarily drawn to scale.

REFERENCE NUMERALS

10. Box;
11. First portion;
12. Second portion;
13. Accommodation space;
20. Battery cell;
21. Housing;
22. Electrode assembly;
221. Body portion; 222. tab; 222a. positive tab; 222b. negative tab;
23. End cap assembly;
231. End cap; 2311. first body; 2312. first protruding portion; 2313. first recessed part; 232. electrode terminal; 2321. end face; 232a. positive electrode terminal; 232b. negative electrode terminal; 233. pressure relief mechanism; 234. current collecting member; 235. end cap patch; 2351. through-hole; 2352. first part; 2353. second part; 2354. component hole; 2355. component hole; 236. insulation piece; 2361. second body; 2362.

second protruding portion; 2363. second recessed portion;

24. Heat transfer member;

241. First connecting portion; 242. second connecting portion;

30. Battery module;

40. Busbar component;

50. Thermal management component;

501. Outer surface;

60. Temperature sensor;

100. Battery;

200. Controller;

300. Motor; and

1000. Vehicle.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as nonexclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

"A plurality of" referred to in this application means two or more (including two).

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. The positive active material layer is coated on a surface of the positive current collector. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. Of the negative current collector, a part uncoated with the negative active material layer protrudes from a part coated with the negative active material layer. The part, uncoated with the negative active material layer, of the negative current collector, serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. In addition, the electrode assembly may be a jelly-roll structure or a stacked structure, without being limited herein.

Currently, a battery cell generally includes a housing, an electrode assembly, and an end cap assembly. The end cap assembly fits and covers an opening of the housing to provide a closed space for the electrode assembly and an electrolytic solution.

The inventor finds that a battery generates a lot of heat while being charged, discharged, or in use. An end cap patch, which is attached onto an end cap surface of the end cap assembly to serve protective and insulative purposes, affects heat dissipation of the end cap. If not dissipated, the heat in the closed space formed by the housing and the end cap assembly not only shortens the service life of the battery, but also poses safety hazards.

In view of this, an embodiment of this application provides a technical solution. An end cap assembly applicable to a battery cell is disclosed. The end cap assembly includes: an end cap; and an end cap patch attached to the end cap. At least one through-hole is made on the end cap patch. The through-hole is configured to be filled with a heat transfer member or structure. The end cap exchanges heat with the outside through the heat transfer member, so as to regulate a temperature inside the battery cell and improve the service life and safety of the battery.

The technical solution described in this embodiment of this application is applicable to a battery and an electrical device.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000.

The vehicle 1000 may further include a controller 200 and a motor 300. The controller 200 is configured to control the battery 100 to supply power to the motor 300, for example, to start or navigate the vehicle 1000, or meet the operating power requirements of the vehicle in operation.

In some embodiments, the battery 100 serves not only as an operating power supply of the vehicle 1000, but may also serve as a drive power supply of the vehicle 1000 to provide driving power for the vehicle 1000 in place of or partially in place of oil or natural gas.

Figure 2:
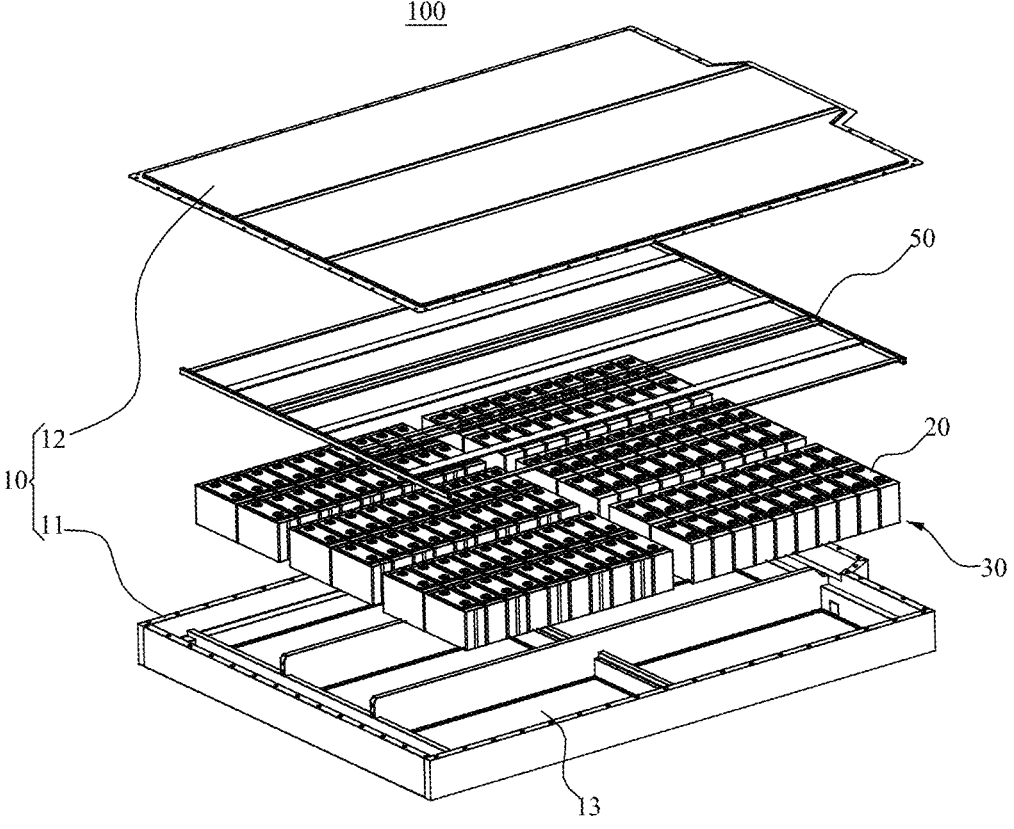
FIG. 2 is a schematic structural diagram of a battery according to an embodiment of this application.

In some embodiments, referring to FIG. 2, FIG. 2 is a schematic structural diagram of a battery 100 according to some embodiments of this application. The battery 100 includes a box 10 and a battery cell 20. The battery cell 20 is accommodated in the box 10.

The box 10 may be in various shapes such as a cylinder or a cuboid. The box 10 may be one of various structures.

In some embodiments, the box 10 may include a first portion 11 and a second portion 12. The first portion 11 and the second portion 12 fit and cover each other to define an accommodation space 13 configured to accommodate the battery cell Definitely, a junction between the first portion 11 and the second portion 12 may be sealed by a sealing element. The sealing element may be a sealing ring, a sealant, or the like.

The first portion 11 and the second portion 12 may be in various shapes, such as a cuboid or cylinder. The first portion 11 may be a hollow structure opened at one side. The second portion 12 may also be a hollow structure opened at one side. The opening side of the second portion 12 fits and covers the opening side of the first portion 11 to form the box 10 that possesses the accommodation space 13. Alternatively, the first portion 11 is a hollow structure opened at one side, and the second portion 12 is a plate-like structure. The second portion 12 fits and covers the opening side of the first portion 11 to form the box 10 that possesses the accommodation space 13.

There may be one or more battery cells 20 in the battery 100. If there are a plurality of battery cells 20, the plurality of battery cells 20 may be connected in series, parallel, or series-and-parallel pattern. The series-and-parallel pattern means a combination of series connection and parallel connection of the plurality of battery cells 20.

In some embodiments, still referring to FIG. 2, the battery 100 may further include a thermal management component or structure 50. The thermal management component 50 is configured to regulate the temperature of the battery cell 20.

The thermal management component 50 is a component configured to regulate the temperature of the battery cell 20. The temperature regulating herein is to heat or cool the battery cell 20. In other words, the thermal management component 50 may be a heating component configured to heat the battery cell 20, or a cooling component configured to cool the battery cell 20.

Illustratively, the thermal management component 50 is configured to accommodate a fluid to regulate the temperature of a plurality of battery cells 20. The fluid herein may be a liquid or gas, such as water, a mixture of water and glycol, or air.

The thermal management component 50 may be mounted inside the box 10. The thermal management component 50 may be mounted in the first portion 11 of the box 10, or may be mounted in the second portion 12 of the box 10.

The shape of the thermal management component 50 is not limited herein, and may be flat plate-shaped as a whole, or formed by connecting a plurality of strip structures, as long as the thermal management component can transfer heat to the battery cell 20 or take away the heat of the battery cell 20.

Figure 3:
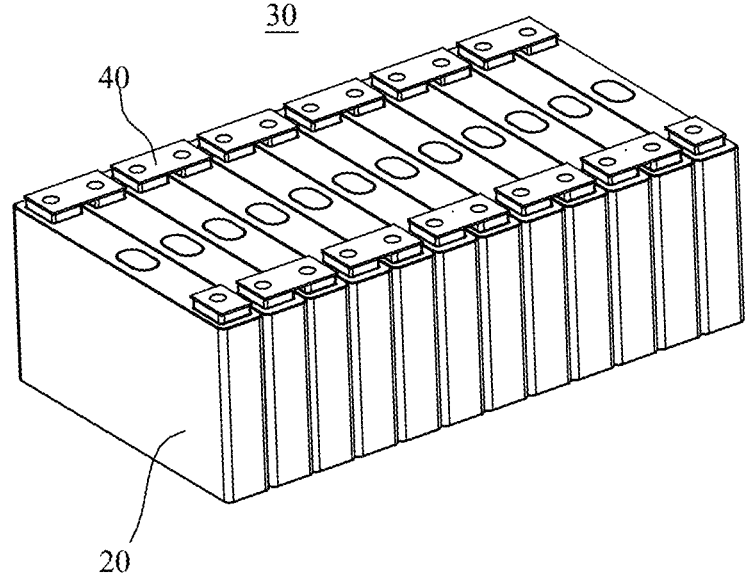
FIG. 3 is a schematic structural diagram of a battery module shown in FIG. 2.

In some embodiments, referring to FIG. 3, FIG. 3 is a schematic structural diagram of a battery module 30 shown in FIG. 2. A plurality of battery cells 20 may be connected in series, parallel, or series-and-parallel pattern to form a battery module 30, and then a plurality of battery modules 30 may be connected in series, parallel, or series-and-parallel pattern to form a whole to be accommodated in the box 10 (shown in FIG. 2). In other embodiments, the plurality of battery cells 20 may be directly connected in series, parallel, or series-and-parallel pattern, and then the whole of the plurality of battery cells 20 may be accommodated in the box 10.

In some embodiments, the battery 100 may further include a busbar component 40. The plurality of battery cells 20 may be electrically connected by the busbar component 40, so as to implement series connection, parallel connection, or series-and-parallel connection between the plurality of battery cells 20.

The busbar component 40 may be a metal conductor, such as copper, iron, aluminum, stainless steel, or aluminum alloy.

Figure 4:
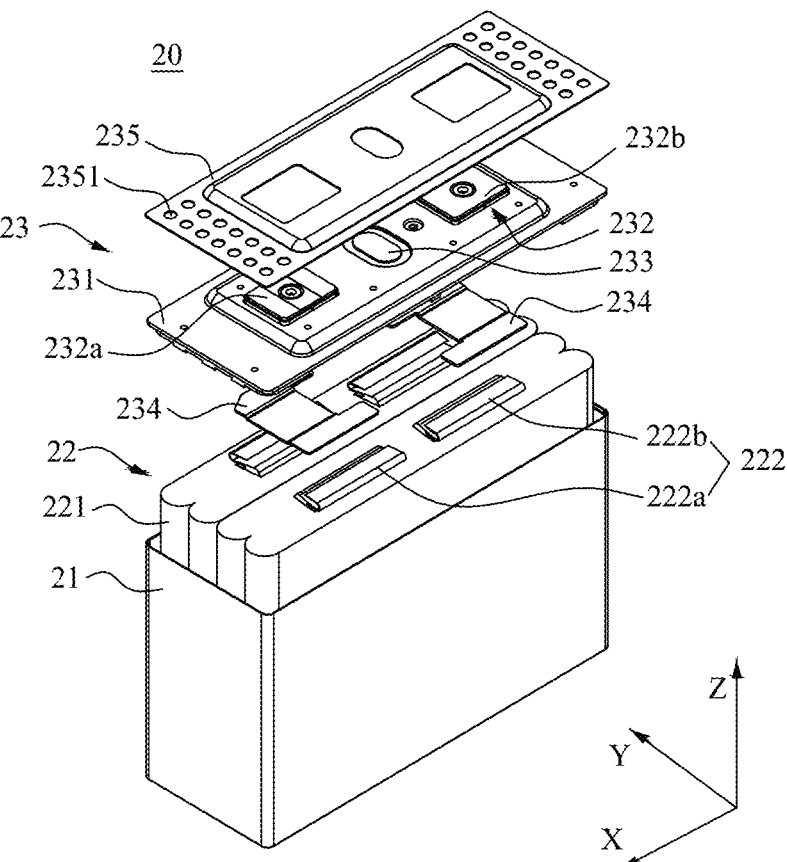
FIG. 4 is an exploded view of a battery cell according to some embodiments of this application.

Referring to FIG. 4, FIG. 4 is an exploded view of a battery cell 20 according to some embodiments of this application. The battery cell 20 may include a housing 21, an electrode assembly 22, and an end cap assembly 23. An opening is made on the housing 21. The electrode assembly 22 is accommodated in the housing 21. The end cap assembly 23 is configured to fit and cover the opening.

The housing 21 may be in various shapes such as a cylinder or cuboid. The shape of the housing 21 may be determined depending on the specific shape of the electrode assembly 22. For example, if the electrode assembly 22 is a cylindrical structure, the housing 21 may be a cylindrical structure. If the electrode assembly 22 is a cuboidal structure, the housing 21 may be a cuboidal structure.

Illustratively, in FIG. 4, the housing 21 is a hollow cuboid structure opened at one end.

The housing 21 may be made of a variety of materials such as plastic, copper, iron, aluminum, stainless steel, or aluminum alloy, without being particularly limited in embodiments of this application.

It is hereby noted that one or more electrode assemblies 22 may be accommodated in the housing 21. Illustratively, in FIG. 4, two electrode assemblies 22 are accommodated in the housing 21, and the two electrode assemblies 22 are stacked in the housing 21.

In some embodiments, each electrode assembly 22 may include a body portion 221 and tabs 222. The tabs 222 extend from the body portion 221. The body portion 221 may include a positive electrode plate, a negative electrode plate, and a separator. The body portion 221 may be a jelly-roll structure formed by winding the positive electrode plate, the separator, and the negative electrode plate. Alternatively, the body portion 221 may be a stacked structure formed by stacking the positive electrode plate, the separator, and the negative electrode plate.

A positive tab 222a and a negative tab 222b may be located on the same side of the body portion 221, or located on two opposite sides of the body portion 221 respectively. In FIG. 4, an example is shown in which the positive tab 222a and the negative tab 222b are located on the same side of the body portion 221.

In some embodiments, still referring to FIG. 4, the end cap assembly 23 may include an end cap 231 and an electrode terminal 232. The end cap 231 is configured to fit and cover the opening of the housing 21. The electrode terminal 232 is mounted on the end cap 231. The electrode terminal 232 is configured to electrically connect to the tabs 222. The electrode terminal 232 is configured to output electrical energy of the battery cell 20.

The end cap 231 fits and covers the opening of the housing 21 to form a closed space configured to accommodate the electrode assembly 22 and an electrolyte. The electrolyte may be an electrolytic solution.

The number of electrode terminals 232 in the end cap assembly 23 may be one or more. Using an example in which the end cap assembly 23 includes two electrode terminals 232, the two electrode terminals 232 may be a positive electrode terminal 232a and a negative electrode terminal 232b respectively. The positive electrode terminal 232a is configured to electrically connect to the positive tab 222a, and the negative electrode terminal 232b is configured to electrically connect to the negative tab 222b.

In some embodiments, the end cap assembly 23 may further include a pressure relief mechanism 233. The pressure relief mechanism 233 is configured to release the pressure inside the battery cell 20 when the internal pressure or temperature of the battery cell 20 reaches a threshold. The pressure relief mechanism 233 is mounted on the end cap 231.

The pressure relief mechanism 233 may be a component such as an explosion-proof valve, a rupture disk, a gas valve, or a pressure relief valve.

In some embodiments, the battery cell 20 may further include a current collecting member 234. The electrode terminal 232 is electrically connected to the tab 222 by the current collecting member 234.

In FIG. 4, using an example in which the end cap assembly 23 includes two electrode terminals 232, the two electrode terminals 232 are a positive electrode terminal 232a and a negative electrode terminal 232b respectively. The positive electrode terminal 232a may be electrically connected to the positive tab 222a of the electrode assembly 22 by one current collecting member 234, and the negative electrode terminal 232b may be electrically connected to the negative tab 222b of the electrode assembly 22 by another current collecting member 234.

The current collecting member 234 may be a metal conductor, such as copper, iron, aluminum, stainless steel, or aluminum alloy.

In some embodiments, the battery cell 20 further includes an end cap patch 235. The end cap patch 235 is attached to the end cap 231. The end cap patch 235 is made of an insulation material, so as to protect the end cap 231 from damage on the other hand, and on the other hand, serve an insulating function to prevent contact and a short circuit between the end cap 231 and other lines.

Figure 5:
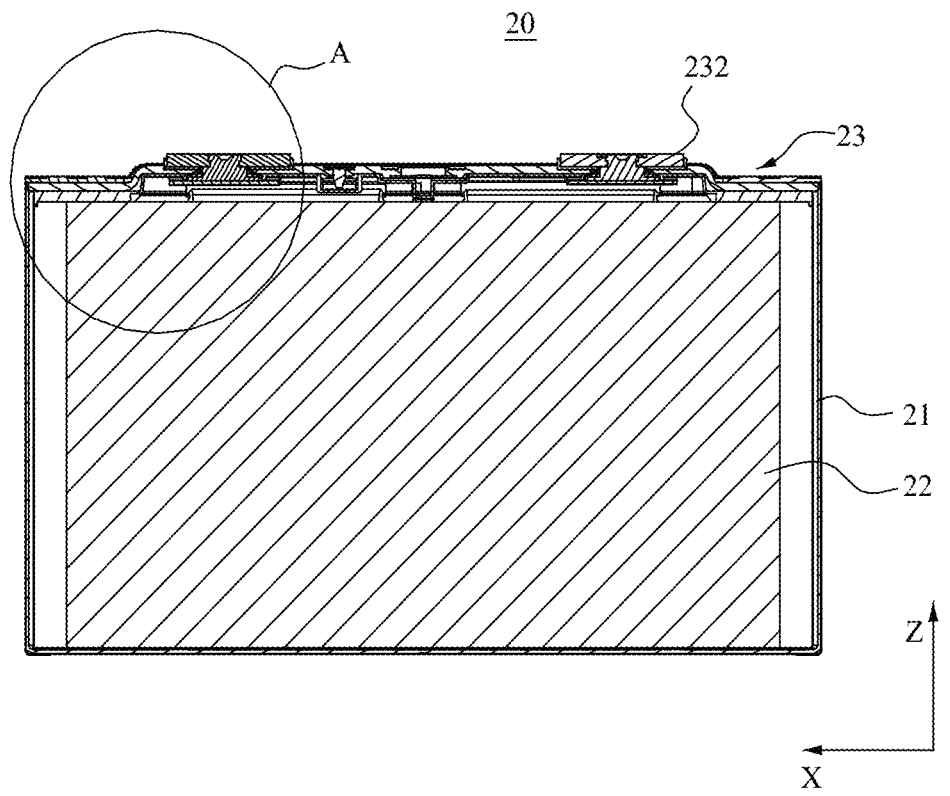
FIG. 5 is a sectional view of the battery cell shown in FIG. 4 after being assembled.
Figure 6:
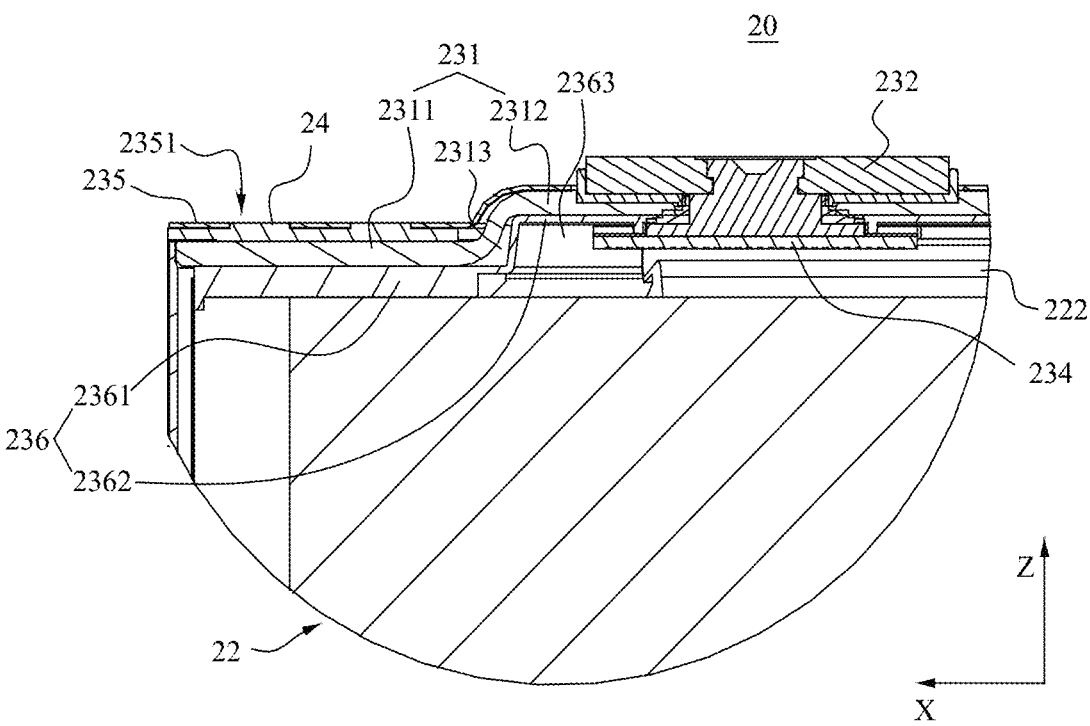
FIG. 6 is a close-up view of a part A shown in FIG. 5.

In embodiments of this application, referring to FIG. 5 and FIG. 6, FIG. 5 is a sectional view of the battery cell shown in FIG. 4 after being assembled, and FIG. 6 is a close-up view of the part A shown in FIG. 5. The end cap assembly 23 includes an end cap 231 and end cap patch 235. The end cap patch 235 is attached to the end cap 231. At least one through-hole 2351 is made on the end cap patch 235. The through-hole 2351 is configured to be filled with a heat transfer member 24. The end cap 231 exchanges heat with the outside through the heat transfer member 24, so as to regulate the temperature inside the battery cell 20. As an optional way of attaching the end cap patch 235 to the end cap 231, the end cap patch 235 is affixed to the end cap 231. The end cap 231 exchanges heat with the outside through the heat transfer member 24 by exchanging heat with the air in the surroundings of the battery cell 20, or by exchanging heat with other heat exchange devices such as a thermal management component 50 (shown in FIG. 2) of the battery 100.

In the end cap assembly 23 according to embodiments of this application, the through-hole 2351 is filled with the heat transfer member 24. Heat is transferred by using the heat transfer member 24. The battery cell 20 can exchange heat with the outside through the end cap 231 and the heat transfer member 24 to regulate the temperature inside the battery cell 20, thereby improving the service life and safety of the battery.

In some embodiments, the heat transfer member 24 is a heat transfer gel. The heat transfer gel possesses good properties of heat transfer and electrical insulation, and it is convenient to fill the through-hole 2351 with the heat transfer gel.

In some embodiments, still referring to FIG. 6, the end cap 231 includes a first body 2311 and a first protruding portion 2312. The first protruding portion 2312 protrudes away from the interior of the battery cell 20. A first recessed portion 2313 recessed away from the interior of the battery cell 20 is formed at a position that corresponds to the first protruding portion 2312 and that is located on the first body 2311. The first recessed portion 2313 is configured to accommodate at least a part of an electrode assembly 22 of the battery cell 20. In embodiments of this application, the at least a part of the electrode assembly 22 may be at least a part of the tab 222.

The first recessed portion 2313 can accommodate at least a part of the electrode assembly 22, thereby vacating more space for the electrode assembly 22 and helping to increase the energy density of the battery cell 20. The disposed first protruding portion 2312 can make the first recessed portion 2313 recessed away from the interior of the battery cell 20 as far as practicable, thereby helping at least a part of the electrode assembly 22 be accommodated in the first recessed portion 2313.

It is hereby noted that when at least a part that is of the electrode assembly 22 and that is accommodated in the first recessed portion 2313 is the tab 222, the first recessed portion 2313 may accommodate at least a part of the positive tab 222a alone, or may accommodate at least a part of the negative tab 222b alone, or, definitely, may accommodate at least a part of the positive tab 222a and at least a part of the negative tab 222b.

In some embodiments, still referring to FIG. 6, the electrode terminals 232 are mounted on the first protruding portion 2312. In a case that the electrode terminals 232 are electrically connected to the tabs 222 by the current collecting member 234, the current collecting member 234 may be accommodated in the first recessed portion 2313.

In some embodiments, still referring to FIG. 6, the end cap assembly 23 may further include an insulation piece or structure 236. The insulation piece 236 is disposed on a side that is of the end cap 231 and that is oriented toward the interior of the battery cell 20. The insulation piece 236 may serve to isolate the end cap 231 from the electrode assembly 22, and reduce the risk of a short circuit of the battery cell 20 caused by contact between the end cap 231 and the electrode assembly 22.

In embodiments of this application, the insulation piece 236 is made of an insulation material, and the insulation piece 236 may be made of a material such as rubber and plastic. The end cap 231 may be made of a metal material, such as copper, iron, aluminum, stainless steel, or aluminum alloy.

It is hereby noted that, in embodiments of this application, when the end cap assembly 23 includes no insulation piece 236, the end cap 231 may be made of an insulation material.

In some embodiments, still referring to FIG. 6, the insulation piece 236 may include a second body 2361 and a second protruding portion 2362. The second protruding portion 2362 protrudes away from the interior of the battery cell 20. A second recessed portion 2363 recessed away from the interior of the battery cell 20 is formed at a position that corresponds to the second protruding portion 2362 and that is located on the second body 2361. The first recessed portion 2313 is configured to accommodate the second protruding portion 2362, and the second recessed portion 2363 is configured to accommodate at least a part of the electrode assembly 22.

In some embodiments of this application, still referring to FIG. 6, the through-hole 2351 is made in a part of the end cap patch 235 at which the end cap patch is attached to the first body 2311. The through-hole 2351 is made in the part of the end cap patch 235 at which the end cap patch is attached to the first body 2311, and the part of the first body 2311 is closer to the interior of the battery cell 20 than the first protruding portion 2312, thereby helping to regulate the temperature inside the battery cell 20.

It is hereby noted that the through-hole 2351 may also be made on the first protruding portion 2312. In embodiments of this application, the through-hole 2351 may be not disposed on the first protruding portion 2312.

Figure 7:
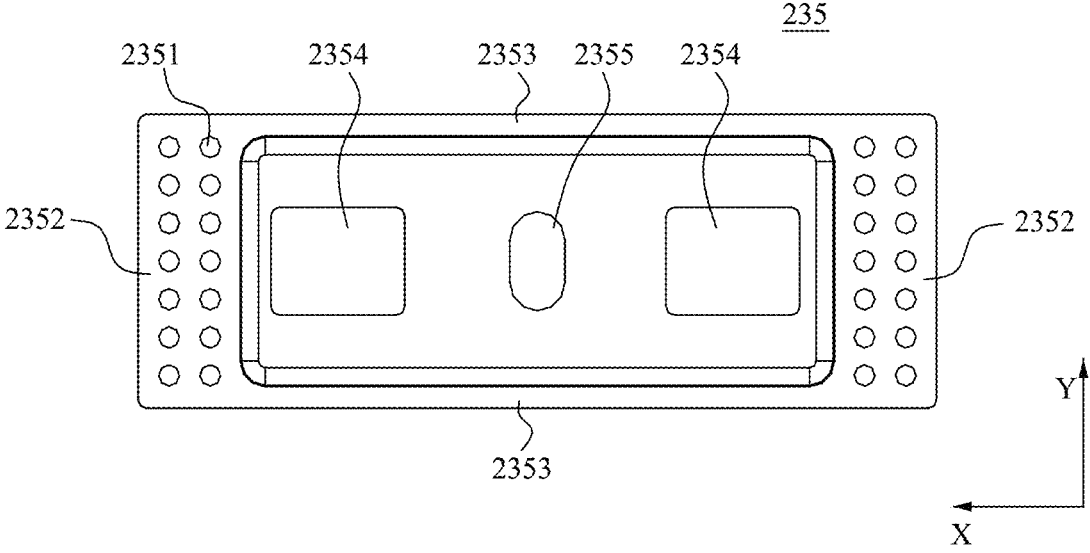
FIG. 7 is a top view of an end cap patch shown in FIG. 4.

In some embodiments of this application, referring to FIG. 6 and FIG. 7, FIG. 7 is a top view of the end cap assembly 235 shown in FIG. 4. The end cap patch 235 includes a first part 2352 and a second part 2353 that are attached to the first body 2311. Along a length direction X of the end cap patch 235, the first part 2352 is located on both sides of the first protruding portion 2312. Along a width direction Y of the end cap patch 235, the second part 2353 is located on both sides of the first protruding portion 2312. The second part 2353 is located between the two first parts 2352, and the through-hole 2351 is made in the first parts 2352. The second part 2353 is located on both sides of the first protruding portion 2312 along the width direction Y of the end cap patch 235. The width of the second part 2353 is usually small, and it is not convenient to make a hole on the second part. The first part 2352 is disposed on both sides along the length direction of the end cap patch 235. The width of the first part 2352 is much greater than the width of the second part 2353, thereby facilitating opening of the through-hole 2351.

It is hereby noted that, on the first protruding portion 2312, the end cap patch 235 may be attached, or the end cap patch 235 may be not attached. When the end cap patch 235 is attached onto the first protruding portion 2312, component holes 2354 and 2355 are made at positions corresponding to the electrode terminal 232 and the pressure relief mechanism 233 respectively on the first protruding portion 2312. If there are other functional components, corresponding component holes also need to be made to avoid interference with the functional components.

In some embodiments of this application, still referring to FIG. 7, the aperture of the through-hole is less than 10 mm, so as to ensure high insulation performance of the end cap patch 235. If the aperture of the through-hole 2351 is excessive, the insulation performance of the end cap patch 235 will be impaired.

In some embodiments of this application, still referring to FIG. 7, a total area of all through-holes 2351 is 10% to 50% of the area of the first part 2352. The larger the total area of the through-holes 2351, the worse the insulation performance. The smaller the total area of the through-holes 2351, the worse the heat transfer performance. The total area of the through-holes 2351 being set to 10% to 50% of the area of the first part 2352 not only ensures relatively high insulation performance of the end cap patch 235, but also ensures a sufficient area of the heat transfer member 24 in the through-hole 2351, without impairing the heat transfer performance.

Figure 8:
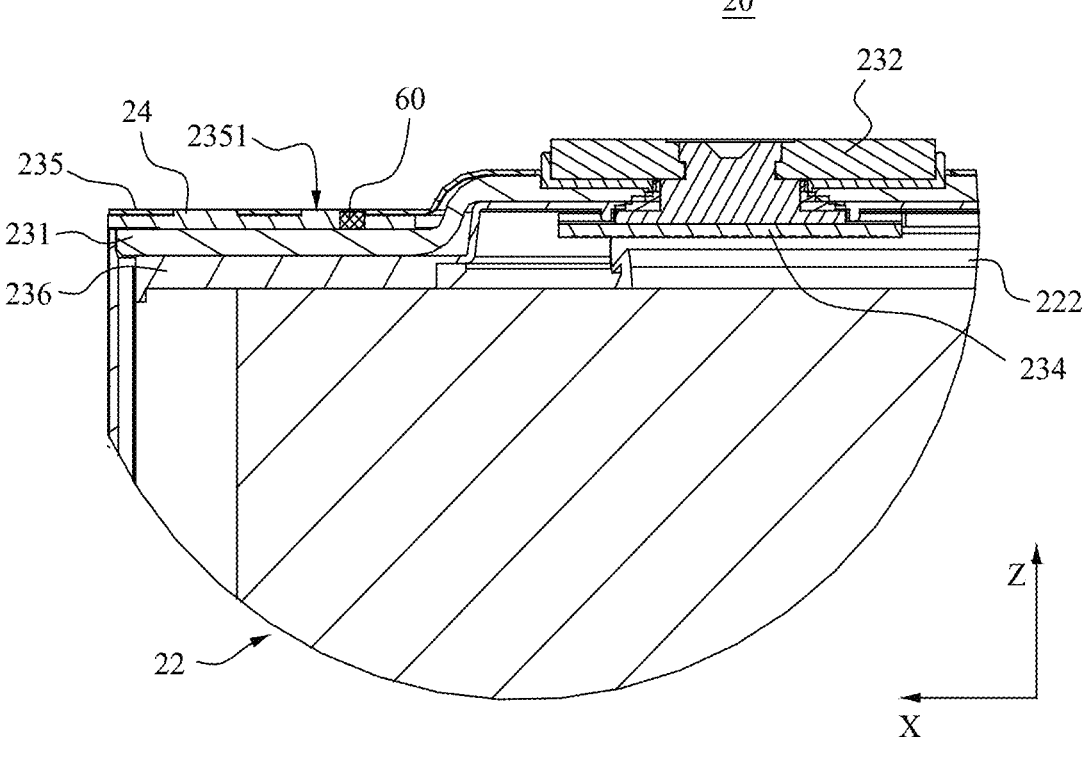
FIG. 8 is a local sectional view of a battery cell according to still other embodiments of this application.

In some embodiments of this application, referring to FIG. 8, FIG. 8 is a local sectional view of a battery cell according to still other embodiments of this application. A temperature sensor 60 is disposed in the through-hole 2351 and configured to acquire a temperature inside the battery cell 20. With the temperature sensor 60 disposed in the through-hole 2351, the temperature sensor 60 can be fixed through the heat transfer member 24, thereby facilitating fixation of the temperature sensor 60. In this way, the temperature inside the battery cell 20 can be acquired conveniently through the heat transfer of the heat transfer member 24, thereby facilitating temperature acquisition.

An embodiment of this application further provides a battery cell 20. The battery cell 20 may include a housing 21, an electrode assembly 22, and an end cap assembly 23 according to any of the foregoing embodiments. An opening (shown in FIG. 4) is made at an end of the housing 21. The electrode assembly 22 is accommodated in the housing 21. The end cap assembly 23 is configured to fit and cover the opening.

Figure 9:
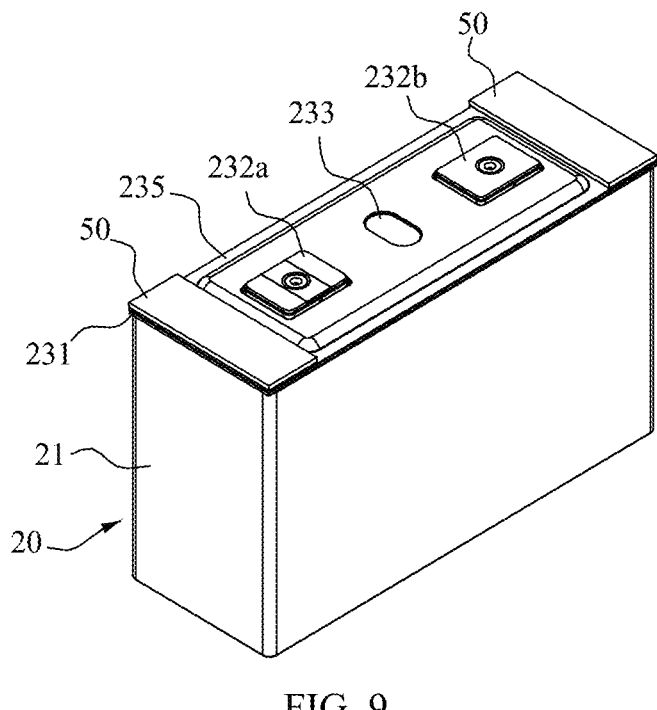
FIG. 9 is a schematic diagram of connection between the battery cell shown in FIG. 4 and a thermal management component.
Figure 10:
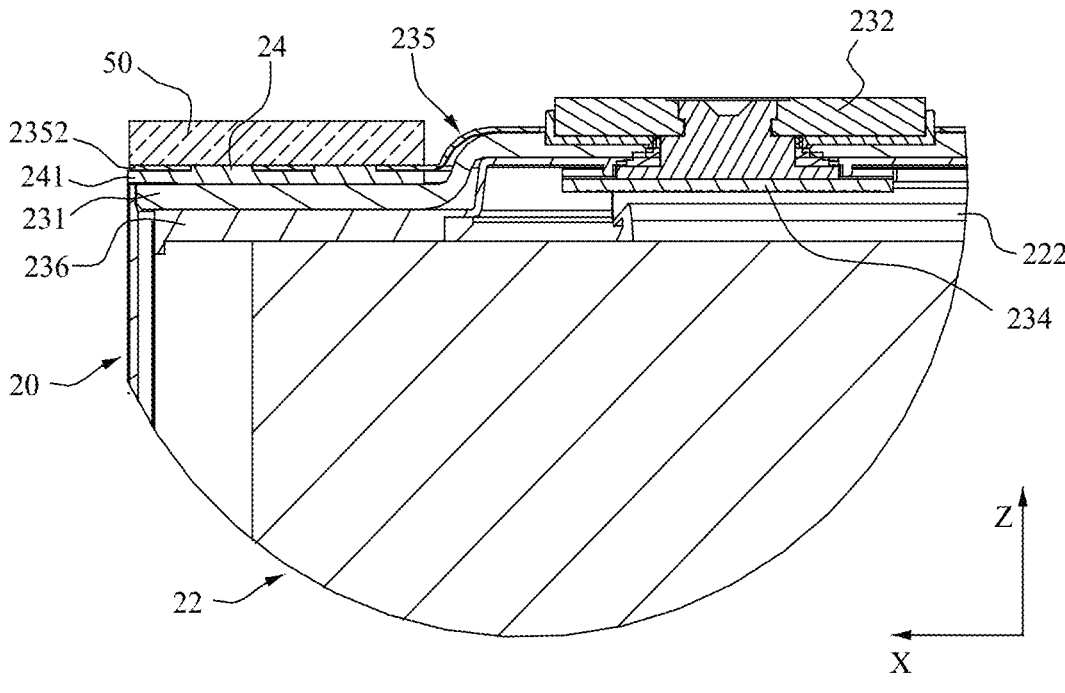
FIG. 10 is a local sectional view of connection between the battery cell shown in FIG. 9 and a thermal management component.

An embodiment of this application further provides a battery 100. Referring to FIG. 9 and FIG. 10, FIG. 9 is a schematic diagram of connection between the battery cell 20 shown in FIG. 4 and a thermal management component 50, and FIG. 10 is a local sectional view of connection between the battery cell 20 shown in FIG. 9 and the thermal management component 50. The battery 100 includes the battery cell 20 according to the foregoing embodiment, and a thermal management component 50. The end cap 231 exchanges heat with the thermal management component 50 through the heat transfer member 24, so as to regulate the temperature inside the battery cell 20. The end cap 231 can exchange heat with the thermal management component 50 through the heat transfer member 24, thereby improving efficiency of heat transfer between the battery cell 20 and the thermal management component 50, and making it convenient to regulate the temperature of the battery cell 20 through the thermal management component 50.

In some embodiments of this application, still referring to FIG. 10, the thermal management component 50 is attached to a first part 2352, and the thermal management component 50 is configured to regulate the temperature inside the battery cell 20. The thermal management component 50 exchanges heat with the end cap 231 through the heat transfer member 24 in the through-hole 2351 of the first part 2352, thereby implementing heat transfer between the battery cell 20 and the thermal management component 50, and making it convenient to regulate the temperature of the battery cell 20 through the thermal management component 50. The term "attach" may mean that the thermal management component 50 is in contact with but not connected to the first part 2352, or mean that they are connected together.

In some embodiments of this application, still referring to FIG. 10, the heat transfer member 24 includes a first connecting portion 241. The first connecting portion 241 is disposed between the end cap 231 and the end cap patch 235. The gap between the end cap 231 and the end cap patch 235 may be filled with the first connecting portion 241 of the heat transfer member 24. In addition, the first connecting portion 241 disposed between the end cap 231 and the end cap patch 235 further improves the effect of heat transfer between the end cap 231 and the thermal management component 50.

Figure 11:
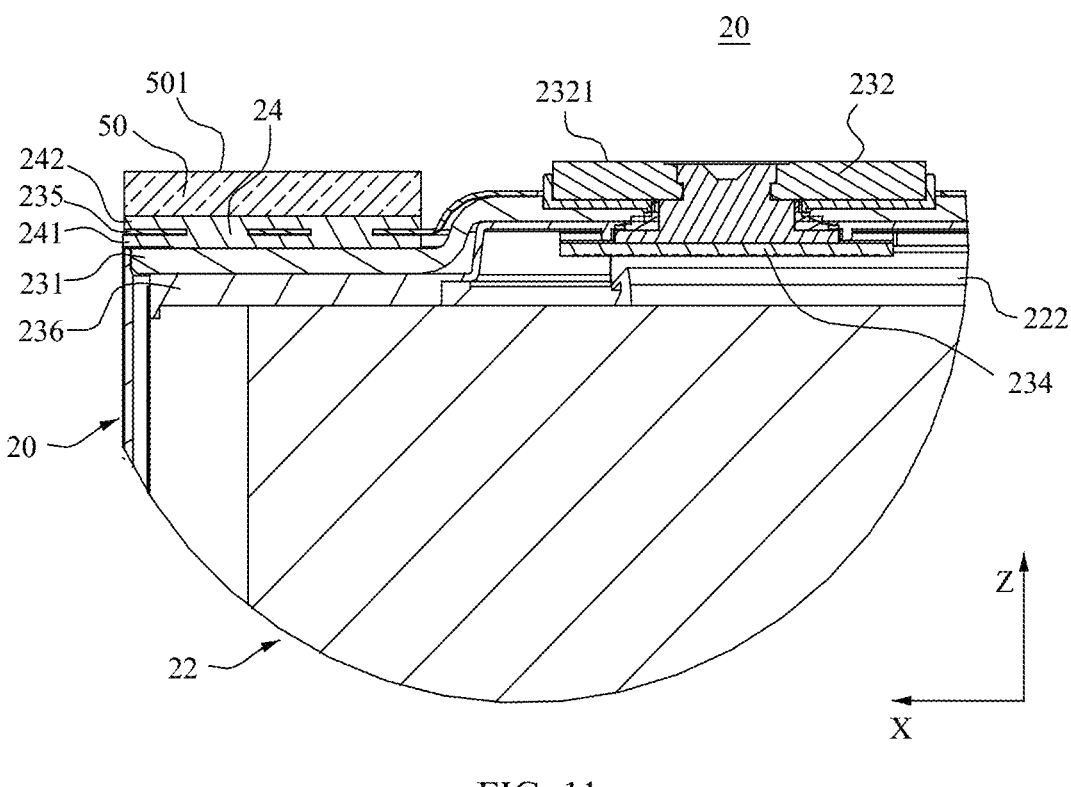
FIG. 11 is a local sectional view of connection between a battery cell and a thermal management component according to still other embodiments of this application.

In some embodiments of this application, referring to FIG. 11, FIG. 11 is a local sectional view of connection between a battery cell 20 and a thermal management component 50 according to still other embodiments of this application. The heat transfer member 24 includes a second connecting portion 242, and the second connecting portion 242 is disposed between the end cap patch 235 and the thermal management component 50. The gap between the heat transfer member and the thermal management component may be filled with the second connecting portion of the heat transfer member, thereby improving stability and firmness of the connection between the thermal management component 50 and the end cap patch 235. In addition, the second connecting portion 242 is disposed between the end cap patch 235 and the thermal management component 50, thereby further improving the effect of heat transfer between the end cap 231 and the thermal management component 50.

In some embodiments of this application, still referring to FIG. 11, an electrode terminal 232 is disposed on the end cap 231. The electrode terminal 232 includes an end face 2321 oriented away from the interior of the battery cell 20. The thermal management component 50 includes an outer surface 501 oriented away from the interior of the battery cell 20. Along a thickness direction Z of the end cap patch 235, the outer surface 501 is closer to the interior of the battery cell 20 than the end face 2321. The outer surface 501 of the thermal management component 50 is closer to the interior of the battery cell 20 than the end face 2321 of the electrode terminal 232. Therefore, the thermal management component 50 disposed on the battery cell 20 is prevented from increasing the overall height of the battery 100.

An embodiment of this application further provides an electrical device. The electrical device includes the battery 100 according to any of the foregoing embodiments. The battery 100 is configured to provide electrical energy.

Although this application has been described with reference to exemplary embodiments, various improvements may be made to the embodiments without departing from the scope of this application, and the components in this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. An end cap assembly, applicable to a battery cell, wherein the end cap assembly comprises:
  an end cap comprising a pair of electrode terminals; and
  an end cap patch attached to the end cap, wherein
  the end cap patch comprises at least one through-hole, the at least one through-hole is filled with a heat transfer structure, and the end cap exchanges heat with an outside through the heat transfer structure so as to regulate a temperature inside the battery cell,
  the end cap comprises a first body having portions on both sides of a first protruding portion along a length direction of the end cap patch,
  the first protruding portion protrudes away from an interior of the battery cell, and
  the first protruding portion extends continuously around and between the pair of electrode terminals along the length direction of the end cap patch.

2. The end cap assembly according to claim 1, wherein the heat transfer structure is a heat transfer gel.

3. The end cap assembly according to claim 1, wherein:
  a first recessed portion recessed away from the interior of the battery cell is formed at a position that corresponds to the first protruding portion and that is located on the first body, and the first recessed portion accommodates at least a part of an electrode assembly of the battery cell, and
  the pair of electrode terminals are mounted on the first protruding portion.

4. The end cap assembly according to claim 3, wherein the at least one through-hole is made in a part of the end cap patch at which the end cap patch is attached to the first body.

5. The end cap assembly according to claim 4, wherein the end cap patch comprises a first part and a second part that are attached to the first body;
  the at least one through-hole comprises a plurality of through-holes;

along the length direction of the end cap patch, two first parts are located on both sides of the first protruding portion respectively;

along a width direction of the end cap patch, the second part is located on both sides of the first protruding portion; and the second part is located between the two first parts, and the plurality of through-holes are made in the first parts.

6. The end cap assembly according to claim 5, wherein a total area of cross sections of the plurality of through-holes in a plane parallel to the first part on the first part is 10% to 50% of an area of the first part.

7. The end cap assembly according to claim 1, wherein a diameter of the at least one through-hole is less than 10 mm.

8. The end cap assembly according to claim 1, wherein a temperature sensor is disposed in the at least one through-hole to acquire the temperature inside the battery cell.

9. The end cap assembly according to claim 1, further comprising an insulation structure disposed on a side that is of the end cap and oriented toward the interior of the battery cell, and the insulation structure isolates the end cap from an electrode assembly of the battery cell.

10. The end assembly according to claim 9, wherein the insulation structure is made of rubber or plastic.

11. The end assembly according to claim 9, wherein the insulation structure includes a second body and a second protruding portion, the second protruding portion protrudes away from the interior of the battery cell, a second recessed portion recessed away from the interior of the battery cell is formed at a position that corresponds to the second protruding portion and that is located on the second body, and the second recessed portion accommodates at least a part of the electrode assembly.

12. The end assembly according to claim 1, wherein the end cap is made of a metal material.

13. The end cap assembly according to claim 1, wherein the first protruding portion located between the pair of electrode terminals extends in a protruding portion plane farther away from the interior of the battery than a first body portion plane that extends along the first body and is parallel with the protruding portion plane, the first body is connected to the first protruding portion by an angled portion, and the angled portion is angled with respect to both the protruding portion plane and the first body portion plane.

14. The end cap assembly according to claim 13, wherein the end cap further comprises a pressure relief mechanism located between the pair of electrode terminals, the pressure relief mechanism releases pressure inside the battery cell in response to an internal pressure or the temperature inside the battery cell exceeding a predetermined threshold.

15. The end cap assembly according to claim 14, wherein the pressure relief mechanism corresponds to at least one of an explosion-proof valve, a rupture disk, a gas valve, or a pressure relief valve.

16. A battery cell, comprising:

a housing, wherein an opening is made at an end of the housing;

an electrode assembly accommodated in the housing; and an end cap assembly, applicable to the battery cell, wherein the end cap assembly comprises:

an end cap comprising a pair of electrode terminals; and an end cap patch attached to the end cap, wherein the end cap patch comprises at least one through-hole, the at least one through-hole is filled with a heat transfer structure, and the end cap exchanges heat with an outside through the heat transfer structure so as to regulate a temperature inside the battery cell, the end cap comprises a first body having portions on both sides of a first protruding portion along a length direction of the end cap patch, the first protruding portion protrudes away from an interior of the battery cell, and the first protruding portion extends continuously around and between the pair of electrode terminals along the length direction of the end cap patch, wherein the end cap fits and covers the opening.

17. A battery, comprising:

the battery cell according to claim 16; and a thermal management structure, wherein the end cap exchanges heat with the thermal management structure through the heat transfer structure so as to regulate the temperature inside the battery cell.

18. The battery according to claim 17, wherein the thermal management structure is attached to a first part of the end cap patch, and the thermal management structure regulates the temperature inside the battery cell.

19. The battery according to claim 17, wherein the heat transfer structure comprises a first connecting portion, and the first connecting portion is disposed between the end cap and the end cap patch.

20. The battery according to claim 17, wherein the heat transfer structure comprises a second connecting portion, and the second connecting portion is disposed between the end cap patch and the thermal management structure.

21. The battery according to claim 17, wherein an electrode terminal among the pair of electrode terminals is disposed on the end cap, and the electrode terminal among the pair of electrode terminals comprises an end face oriented away from the interior of the battery cell;

the thermal management structure comprises an outer surface oriented away from the interior of the battery cell; and along a thickness direction of the end cap patch, the outer surface is closer to the interior of the battery cell than the end face.

22. An electrical device, comprising the battery according to claim 17, wherein the battery is configured to provide electrical energy.

23. The electrical device according to claim 22, wherein the electric device is a vehicle, a mobile phone, a portable device, a notebook computer, a ship, a spacecraft, an electric toy, or a power tool.

* * * * *